United States Patent
Neil et al.

(10) Patent No.: US 6,570,143 B1
(45) Date of Patent: May 27, 2003

(54) WAVEFRONT SENSING DEVICE

(75) Inventors: Mark Andrew Aquilla Neil, Oxford (GB); Tony Wilson, Oxford (GB); Martin James Booth, Warrington (GB)

(73) Assignee: ISIS Innovation Limited, Oxford (GB)

( * ) Notice: Subject to any disclaimer, the term of this patent is extended or adjusted under 35 U.S.C. 154(b) by 0 days.

(21) Appl. No.: 09/787,705

(22) PCT Filed: Sep. 23, 1999

(86) PCT No.: PCT/GB99/03194

§ 371 (c)(1),
(2), (4) Date: May 21, 2001

(87) PCT Pub. No.: WO00/17612

PCT Pub. Date: Mar. 30, 2000

(30) Foreign Application Priority Data

Sep. 23, 1998 (GB) ............................................. 9820664

(51) Int. Cl.[7] ................................................. G01J 1/20
(52) U.S. Cl. .............................. 250/201.9; 250/237 R; 356/121
(58) Field of Search .......................... 250/201.9, 201.1, 250/216, 239, 214 R, 237 R; 257/80–84, 431–435; 356/121, 124; 359/9–11

(56) References Cited

U.S. PATENT DOCUMENTS 4,725,138 A * 2/1988 Wirth et al. ................. 356/121
5,120,128 A 6/1992 Ulich et al. ................. 356/121

FOREIGN PATENT DOCUMENTS

EP 0 446 949 A1 3/1991

OTHER PUBLICATIONS

Glückstad et al., "Improvement of axial response in three–dimensional light focusing by use of dynamic phase compensation", Proceedings of Non–astronomical Adaptive Optics, Osa Technical Digest Series, vol. 13, 1997, p. 10–12–12 XP002090355.

Roddier, "Curvature sensing and compensation: a new concept in adaptive optics", US, Optical Society of America, Washington, vol. 27, No. 7, p. 1223–1225 (1998).

* cited by examiner

*Primary Examiner*—David Porta
*Assistant Examiner*—Patrick J. Lee
(74) *Attorney, Agent, or Firm*—Drinker Biddle & Reath LLP

(57) ABSTRACT

The wavefront sensing device consists of a light source, a binary phase mask (10), a fixed focus lens (11) and at least two finite sized spatially separated detectors (12) positioned in the plane of focus of the wavefront sensing device. The binary phase mask (10) simultaneously applies a positive bias and a negative bias to the wavefront of the incident light such that a pair of spatially separated light points are generated in the plane of focus and detected by the detectors (12). The difference in intensity between the pair of light points is representative of the aberration of the wavefront of the incident light from the ideal.

42 Claims, 6 Drawing Sheets

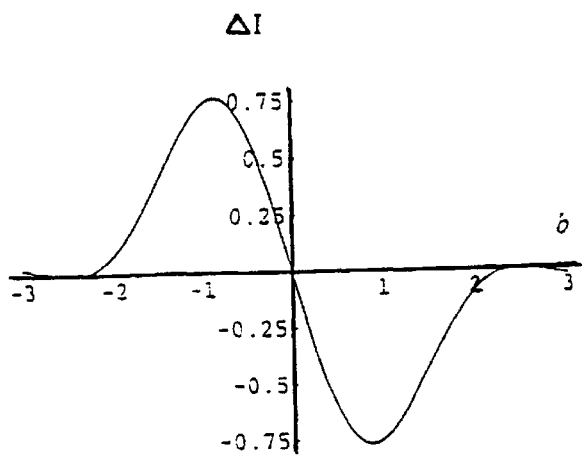
Figure 7
Figure 8
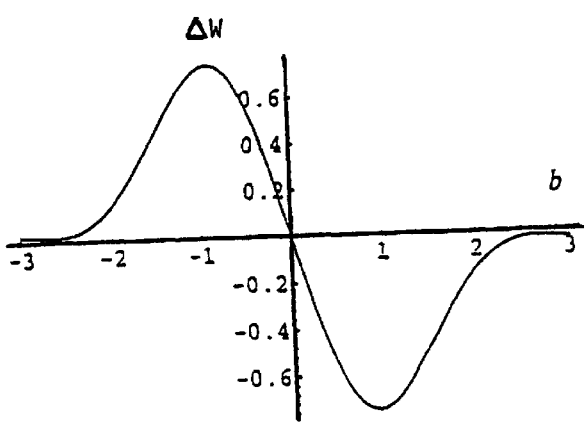
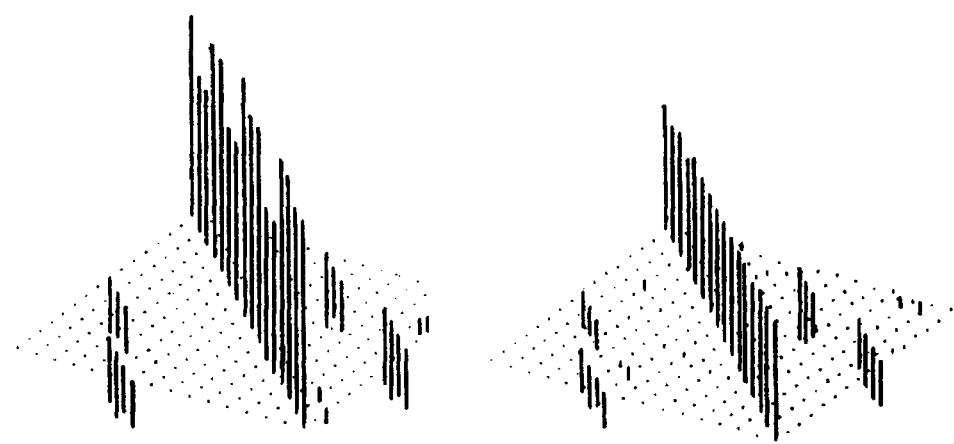
Figure 9a
Figure 9b

WAVEFRONT SENSING DEVICE

The present invention relates to a wavefront sensing device and in particular to a device that senses the deviation in shape of an optical wavefront from its ideal. The wavefront device is particularly, but not exclusively, suitable for use in adaptive optics systems and in confocal microscopes.

An optical system can be considered to be performing at its best when it is free of aberrations. Aberrations in the form of wavefront distortions are particularly problematic and are the cause of degradation in the performance of many telescope and microscope imaging systems. Adaptive optical systems are designed to correct for such aberration and wavefront sensing devices such as the Shack-Hartmann interferometer can be employed to measure the flatness (or deviation from the ideal) of an optical wavefront in the optical system. Once a measure of the flatness of the optical wavefront is known, the optical system can be adapted to correct for the measured aberration.

The Shack-Hartmann wavefront sensor consists of an array of simple lenses and a respective array of quadrant photodetectors. One element of such an array consisting of a lens 1 and a photodetector 2 is shown in FIG. 1. Tilt of the wavefront incident on the lens 1 is translated into a shift in the position of the focussed spot S in the plane of the photodetector 2. The extent of any tilt of a wavefront can therefore be quantified through a suitable combination of signals from the quadrant photodetector 2. With the Shack-Hartmann wavefront sensor the array of such elements is used to measure the local tilt or first differential of the wavefront across a complete aperture and thereby hopefully to reconstruct the complete input wavefront shape.

Wavefront sensing devices are also known for measuring the local defocus or local laplacian of a wavefront. FIG. 2 shows diagramatically one element of a conventional wavefront sensing array that provides a measure of the local defocus of an input wavefront. The element again includes a simple lens 1 but this time two finite sized photodetectors 3, 4 are positioned one in front of the focal plane X of the lens and one behind the focal plane of the lens. This is most conveniently achieved by including a beam splitter 5 with the two detectors 3,4 in orthogonal planes. If the input wavefront is curved, as shown in FIG. 2, then the focal spot will move into focus at one of the detectors and will move out of focus at the other of the detectors. Differential detection gives a signal related to the amount of curvature in the input wavefront.

In a further refinement the two detectors 3,4 can be replaced by a single finite sized detector and the lens 1 replaced by a varifocus lens used to move the focal plane behind and in front of the detector. This refinement of the wavefront sensing element shown in FIG. 2 is the basis of a Roddier curvature sensing device. As in the case of the Shack-Hatmann sensor, in practice an array of such elements would be employed to measure the local wavefront across a complete aperture to thereby reconstruct the complete wavefront shape.

With the present invention a wavefront sensing device is provided comprising a fixed focusing element; at least one detector located at or near the plane of focus; a positive bias wavefront modulating mask and a negative bias wavefront modulating mask each adapted to produce a light point in the plane of focus when illuminated, the difference in intensity between the light points generated by the positive and negative wavefront modulating masks being representative of the deviation of the wavefront shape of the illumination from its ideal.

Ideally, a single wavefront modulating mask is provided that acts as both the positive bias wavefront modulating mask and the negative bias wavefront modulating mask and a pair of spatially separated detectors are provided whereby the single wavefront modulating mask generates a pair of spatially separated light points the difference in intensity between the pair of light points being representative of the deviation of the wavefront shape of the illumination from its ideal.

It should be understood that in the context of this document reference to the detectors being located in or near to the plane of focus is intended as reference to the plane in which an ideal wavefront would come into focus.

Preferably, the wavefront modulating mask is a binary phase mask such as an off axis Fresnel zone plate. Alternatively, the wavefront sensing mask may be a binary polarisation or binary amplitude mask.

In a preferred embodiment, the wavefront modulation mask is patterned with a binarised version of a fraction of the desired wavefront shape to be sensed. The patterning of the binary wavefront modulating mask may be dependent on the desired wavefront shape of the incident illumination defined by reference to one or more Zernike polynomial modes. With this embodiment, ideally the binary wavefront modulating mask is patterned to simultaneously produce a plurality of spatially separated pairs of light points each pair being representative of a different Zernike polynomial mode.

Alternatively, the wavefront modulating mask may be in the form of a spatial light modulator that sequentially forms different biased masks. The different masks may be the positive.and negative bias masks mentioned earlier. In a preferred embodiment the spatial light modulator cycles through a plurality of masks in which each mask may represent a different Zernike polynomial mode (or other system of modes defining wavefront aberration).

The wavefront sensing device may comprise a plurality of wavefront modulating masks, a corresponding array of fixed focusing elements and a corresponding array of pairs of detectors.

The wavefront sensing device may be employed to correct wavefront aberration. Thus, a wavefront correction mask may be provided along with control means for controlling the wavefront correction mask in dependence on the measured aberration measured by a separate wavefront sensing device. With this embodiment the wavefront sensing device may form part of an adaptive optics systems.

In an alternative aspect, the present invention provides an adaptive optics systems comprising one or more fixed focusing elements for imaging a specimen, an adjustable wavefront correction device, a wavefront sensing device as described above and a control device in communication with the wavefront correction device and the wavefront sensing device for adjusting the wavefront correction device in accordance with the wavefront aberration measured by the wavefront sensing device.

In a further aspect the present invention provides a confocal microscope comprising one or more fixed focusing elements for imaging a specimen, a wavefront modulating mask and one or more finite sized detectors for generating a confocal image of the specimen.

The present invention also separately provides a multiphoton confocal microscope comprising one or more fixed focusing elements for imaging a specimen containing one or more fluorescent substances, a wavefront modulating mask and a large area detector whereby a sectioned image of the specimen is generated by virtue of the illuminating light being substantially brighter in the focal region.

With the present invention, a signal is generated when the input wavefront is not perfect with the magnitude of the signal being directly related to the form and magnitude of the input wavefront error. Furthermore, this error signal is relatively large and linear for small input wavefront errors which makes the wavefront sensing device particularly suited to use in adaptive optics systems.

Embodiments of the present invention will now be described by way of example with reference to the accompanying drawings, in which:

FIG. 7 is a graph of the calculated differential output signal from the wavefront sensing device Δl with respect to the defocus b of the incident wavefront for an infinitely small detector;

FIG. 8 is a graph of the differential output signal ΔW with respect to the defocus b of the incident wavefront for a finite detector;

FIGS. 9a and 9b are graphical representations of a sensitivity matrix for Zernike mode detectors;

Figure 1:
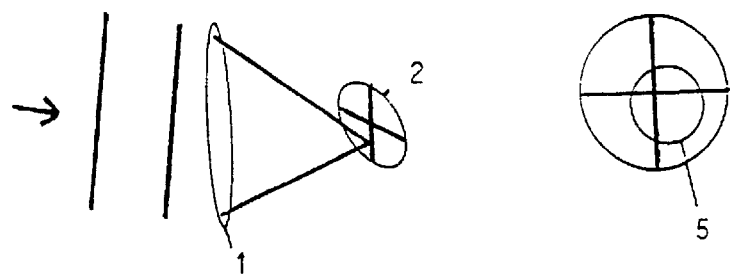
FIG. 1 is a diagram of one element of a conventional Shack-Hartmann wavefront sensor.
Figure 2:
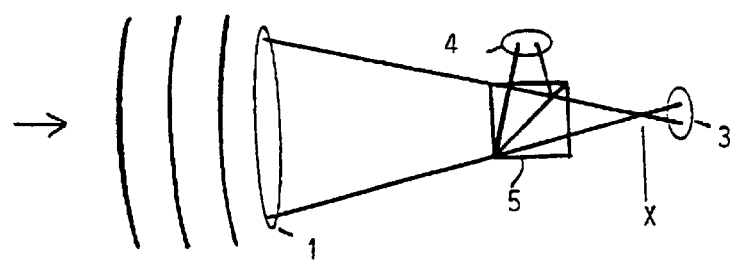
FIG. 2 is a diagram of one element of a conventional wavefront curvature sensing device.
Figure 3:
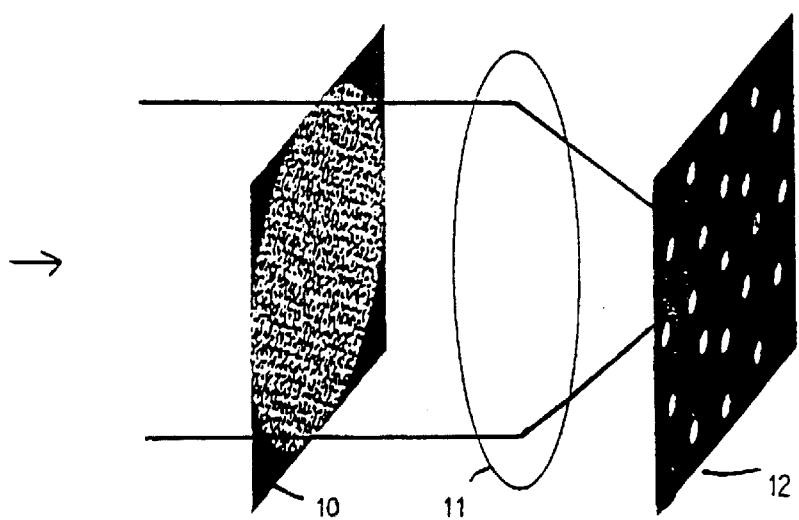
FIG. 3 is a diagram of one element of a wavefront sensing device in accordance with the present invention.
Figure 4:
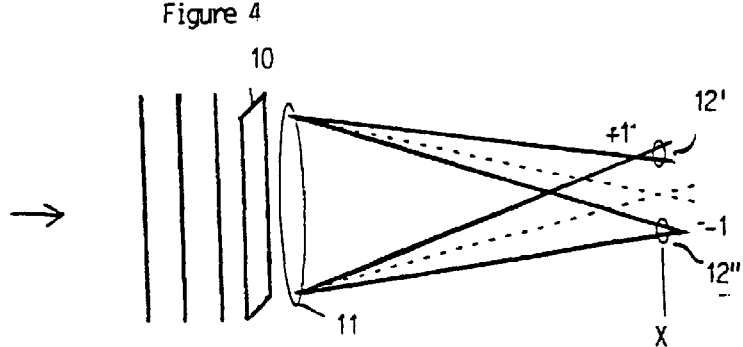
FIG. 4 is a diagram of one element of a wavefront curvature sensing device in accordance with the present invention.

The wavefront sensing device of FIG. 3 consists generally of a binary phase mask 10, a fixed lens 11 and a detector 12 consisting of a pinhole mask having a plurality of finite apertures in the form of pinholes aligned with a plurality of photodetectors in spatially separated pairs. In an alternative arrangement the fixed lens 11 may be replaced by an alternative fixed focusing element such as a mirror. Also, the binary phase mask 10 may be located between the lens or other fixed focusing element 11 and the detector 12.

Where only wavefront curvature (defocus) is to be measured, the binary phase mask may be in the form of an off-axis binary phase-only Fresnel zone plate (FZP) 10 with a single pair of detectors 12', 12" in the plane of focus X, as shown in FIG. 4. Illumination of a FZP in combination with a fixed lens produces two first order spots, positioned symmetrically either side of the focal plane. Although other orders exist, around 81% of the light is accounted for in the first orders. By positioning the FZP off-axis, the position of the +1 order is moved laterally in one direction and the position of the −1 order is moved laterally in the opposite direction so that each spot can be readily detected separately. The pair of detectors is therefore positioned with one of the pair 12' at the +1 defocussed spot and the other of the pair 12" at the −1 defocussed spot. Using a similar analysis to that employed with a Roddier sensing device, the differential signal between the two detectors 12', 12" is representative of the curvature of the input wavefront. That is to say that the combination of the FZP and the fixed lens applies simultaneously equal positive and negative bias to the incident light which in turn generates spatially separated spots which differ in intensity and for which the difference in intensity is representative of the wavefront aberration.

The FZP though is only one embodiment of a binary phase mask specifically suitable for use in the detection of wavefront shape. A further example is given below. Operation of the wavefront sensing device can be explained generally in terms of the phase modulation of the binary phase mask. To assist in an understanding of the invention, the binary phase mask can be described in terms of a phase function $\phi(r,\theta)$ in the pupil plane that is binarised to values of 0 and $\pi$. The transmission of this binary optical element, $\exp[(j\Phi(r,\theta)]$ can then be expressed as:

$$\exp[j\Phi(r,\theta)] = \tfrac{2}{\pi}(\exp[j\phi(r,\theta)] + \exp[-j\phi(r,\theta)]) - \tfrac{1}{3}\exp[j3\phi(r,\theta)] - \tfrac{1}{3}\exp[-j3\phi(r,\theta)]\ldots)$$

If the original phase function $\phi(r,\theta)$ consisted of a tilt term and a defocus term: $\phi(r,\theta)=\phi_{tr}(r,\theta)+\phi_d(r,\theta)$ then the binary element is the off axis zone plate described above. Considering only the +1 order, it can be seen that the binary element represents a transmission of $2\exp(j\phi_d(r,\theta))/\pi$ and for the −1 order the binary element represents a transmission of $2\exp(-j\phi_d(r,\theta))/\pi$.

Figure 5:
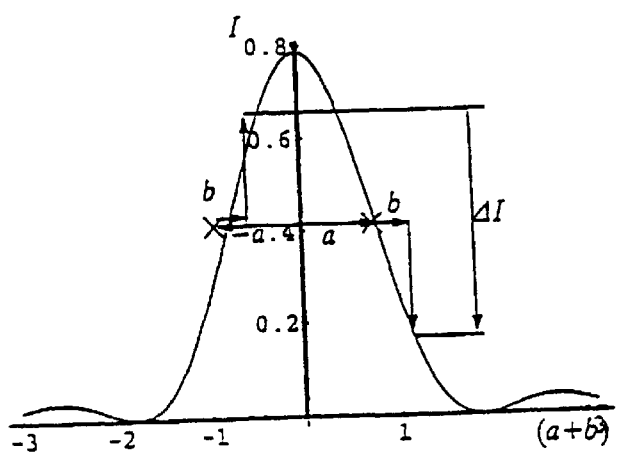
FIG. 5 is a graph of on axis intensity l as a function of defocus parameters of the binary optical element a and the incident wavefront b.

As mentioned above, the FZP is positioned off axis by means of the tilt term $\phi_t(r,\theta)$ to laterally separate the first orders. The amount of defocus $\phi_d(r,\theta)$ programmed into the binary element naturally affects the sensitivity of the binary element to the defocus of an input wavefront that is to be measured. FIG. 5 is a graph of the on axis intensity as a function of the defocus parameters (a+b), in which a is the programmed defocus of the binary element and b is the defocus of the incident wavefront.

For the +1 order the transmission over a unit circle input pupil is $\exp(j\phi_d(r,\theta))/\sqrt{\pi}$, where $\phi_d(r,\theta)=a2\sqrt{3}r^2$ and a is the amount of defocus programmed into the binary element. The factor $1/\sqrt{\pi}$ is a normalisation so that the power in the unit circle is unity and the factor $2\sqrt{3}$ is introduced for consistency with later equations. If the incident wavefront has a phase curvature given by $\psi=\exp(jb2\sqrt{3}r^2)$, where b is a measure of the incident wavefront's curvature, the intensity in the output plane for an input plane amplitude distribution $U(r,\theta)$ is given by the Fraunhoffer approximation:

$$I(\varsigma,\xi) = \left| \frac{1}{2} \int_0^\infty \int_0^{2\pi} U(r,\theta)\exp(j\pi r\varsigma\cos(\theta-\xi))\,d\theta\,r\,dr \right|^2$$

Where normalised co-ordinates $\varsigma=2\varsigma_0/\lambda f$ ($\varsigma_0$ is the real spatial co-ordinate) are chosen, the factor ½ ensures that there is equal power in the input and output planes. The on axis intensity in the focal plane as represented in FIG. 5 is therefore given by:

$$I(0,0) = \left| \frac{1}{2\sqrt{\pi}} \int_0^1 \exp(j(a+b)2\sqrt{3}\, r^2) 2\pi r\, dr \right|^2 = \frac{\pi}{4} \mathrm{sinc}(\sqrt{3}\,(a+b))^2$$

From FIG. 5 it can be seen that with the binary phase mask biased with a defocus of +a and −a, an incident wavefront with a defocus of b shifts the on axis intensity of each order such that a differential signal $\Delta I$ is measured. The sensitivity of the wavefront sensing device can be expressed in terms of the value $dI/db$, evaluated at b =0:

$$\frac{dI}{db} = \frac{\pi}{2a}\left(\mathrm{sinc}(2\sqrt{3}\,a) - \mathrm{sinc}(\sqrt{3}\,a)^2\right)$$

Figure 6:
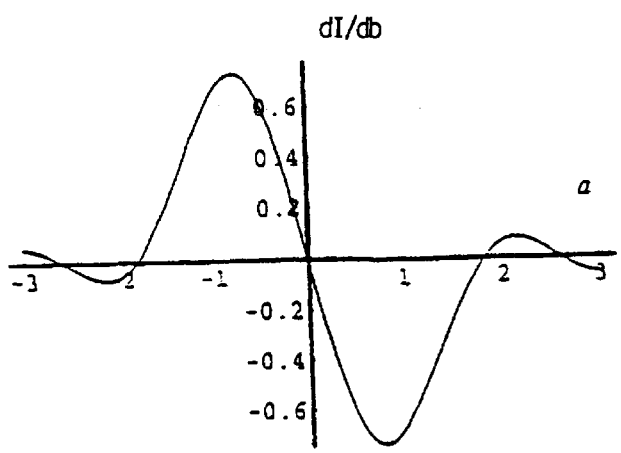
FIG. 6 is a graph of the sensitivity dl/db with respect to the defocus b of the incident wavefront.

In FIG. 6 the sensitivity $dI/db$ is shown as a function of the defocus a of the binary element. From this graph the sensitivity is found to have a minimum of −0.734814 at a=0.752334. Following on from this, FIG. 7 is therefore a graph of the measured signal $\Delta I$ plotted as a function of the defocus b of the incident wavefront, when the defocus a of the binary element is set at a=0.752334. From FIG. 7 it is clear that the wavefront sensing device gives a very steep linear response for small incident wavefront curvature but tends to zero for higher incident curvatures.

Whilst the above provides a mathematical basis for the principle of operation of the wavefront sensing device, this analysis is only true for infinitely small aperture detectors. In order to achieve appreciable power finite sized detectors are required. To determine the preferred size of the detectors the output intensity as a function of output plane position must first be calculated using a 2-dimensional Fourier transform. In order to arrive at a solution it is assumed that as the function being transformed possess circular symmetry the output will also possess circular symmetry. This produces a zeroth Fourier-Bessel transform:

$$I(\varsigma, 0) = \left| \sqrt{\pi} \int_0^1 \exp(j(a+b)2\sqrt{3}\, r^2) J_0(\pi r \varsigma) r\, dr \right|^2$$

From this equation the preferred size of the detector can be determined by integrating over the area of the detector. A centred detector is chosen, as the system possess circular symmetry, of radius P with the detected optical power W9O) being given by:

$$W(P) = \int_0^r I(\varsigma, 0) 2\pi \varsigma\, d\varsigma$$

This confirms that as the radius of the detector increases so the detected power increases and as the defocus increases so the detected power decreases. From the above the maximum sensitivity of the wavefront sensing device is first determined for a wavefront having no defocus b=0. The maximum sensitivity (−0.687615) was found to be achieved with a=0.779164 and P=0.90726. At this point 45.9% of the light in the focal spot is captured by the detector. In the ranges 0.6<a<0.9 and 0.8<P<1.1, close to maximum sensitivity can be achieved. However, larger values of a and P in appropriate combinations may be advantageous as although the maximum slope is reduced, the range over which the device is sensitive can be increased. Finally, in FIG. 8 a graph of the detected differential signal $\Delta W$ as a function of the defocus b of the incident wavefront is shown for the wavefront sensing device set up for maximum sensitivity.

The wavefront sensing device described above may be used as a sub-aperture based curvature sensor with the advantage that all the detectors sit in the same plane. Alternatively, the above technique can be employed to sense any shaped wavefront by constructing a binary optical element whose phase modulation is a binarised version of a fraction of the desired wavefront shape to be sensed as shown in FIG. 3. It is therefore useful to be able to describe a wavefront shape in general terms. One known way is to expand the wavefront phase into a series of Zernike polynomials which have the property of being orthogonal over the unit circle and can be related in some cases to traditional aberrations such as spherical aberration, astigmatism and coma. The Zernike polynomials can be defined as:

$$Z_{nm} \begin{cases} m<0 & \sqrt{2(n+1)}\, R_n^{-m}(r)\sin(-m\theta) \\ m=0 & \sqrt{n+1}\, R_{n0}(r) \\ m>0 & \sqrt{2(n+1)}\, R_n^m(r)\cos(m\theta) \end{cases}$$

where all positive integral values of n are allowed but only restricted values of m are allowed and the radial polynomials are given by:

$$R_n^m(r) = \sum_{s=0}^{(n-m)/2} \frac{(-1)^s (n-s)!}{s!((n+m)/2-s)!((n-m)/2-s)!} r^{n-2s}$$

In the ensuing description the Zernike polynomials will alternatively be referred to by their mode number i, where the modes are ordered in increasing i first by increasing radial order n then by increasing azimuthal order magnitude $|m|$ then by the sign of the azimuthal order m. Thus, n=0,m=0→i=1; n=1, m=1→i=2; n=1, m=−1→i=3; n=2,m=0→i=4; etc.

Using Zernike polynomials graphs similar to FIGS. 7 and 8 can be produced for sensors of individual Zernike polynomials. Because of the orthogonality between Zernike polynomials a wavefront sensor for one mode is generally insensitive to other modes on axis. However, this breaks down for finite sized detectors as some cross sensitivity can arise between closely related modes due to off axis effects. Despite this cross sensitivity, a binary wavefront modulating mask that renders the wavefront sensor sensitive to a mode of positive azimuthal order is insensitive to modes of negative azimuthal order and vice versa. Similarly, a wavefront sensor sensitive to a circularly symmetric mode is only sensitive to other circularly symmetric modes and a sensor for a non-circularly symmetric mode is insensitive to circularly symmetric modes. Even within the group of modes of positive (or negative) azimuthal order, a wavefront sensor for a particular azimuthal order is insensitive to other modes whose azimuthal order is not an odd multiple of the particular azimuthal order. Table 1 is a sensitivity matrix for the sensitivity of Zernike modal sensors (rows) to the various input wavefront Zernike aberrations (columns). This table is also depicted graphically in FIG. 9a.

To minimise off-diagonal elements of the sensitivity matrix the aperture size of the detector and the bias b must be kept small but not so small as to lose the intensity of the on-diagonal elements. It has been found that near maximum on-diagonal sensitivity alone can be achieved with a fairly broad maximum sensitivity peak for all modes in the region a=0.7 and P=1, where P is the pinhole radius for a finite sized circular detector pinhole.

For an arbitrary wavefront shape a series of wavefront sensing masks may be multiplexed in time. However, it is preferable that a single fixed mask be used to sense all the Zernike modes of the wavefront simultaneously, i.e. spatially multiplexed. In order to generate the differential signal it is necessary for two symmetric spots to be produced simultaneously for each Zernike mode; one with a positive Zernike mode offset bias and one with a negative Zernike mode offset bias. Thus, for spatially multiplexed Zernike modes the binary phase mask or filter must be capable of producing a multitude of pairs of spots in different positions in the focal plane corresponding to the Zernike modes to be sensed.

Figure 10:
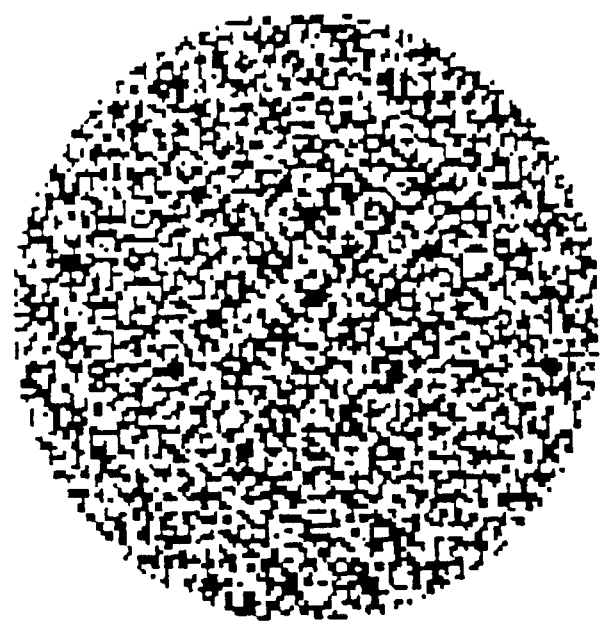
FIG. 10 shows schematically a binary phase mask for use in the wavefront sensing device in accordance with the present invention.

Conventional optimisation techniques such as direct binary search may be used to design a binary phase mask to provide the desired performance in the focal plane of the fixed lens. Usually this technique is used to generate a number of spots in the output plane but the method can be modified using known techniques such that the produced spots each possess the required Zernike modal bias or indeed can be optimised for Zernike mode sensitivity directly. The sensitivity matrix for a binary phase mask designed to sense Zernike modes 4 to 19 is given in Table 2 and is represented graphically in FIG. 9b. FIG. 10 shows such a multiplexed binary phase mask in which the white regions represent a transmission of

TABLE 1

| 4 | 5 | 6 | 7 | 8 | 9 | 10 | 11 |
|---|---|---|---|---|---|---|---|
| −0.66430 | 0 | 0 | 0 | 0 | 0 | 0 | 0.22682 |
| 0 | −0.49233 | 0 | 0 | 0 | 0 | 0 | 0 |
| 0 | 0 | −0.49233 | 0 | 0 | 0 | 0 | 0 |
| 0 | 0 | 0 | −0.68514 | 0 | 0.03513 | 0 | 0 |
| 0 | 0 | 0 | 0 | −0.68154 | 0 | −0.03513 | 0 |
| 0 | 0 | 0 | 0 | 0 | −0.50645 | 0 | 0 |
| 0 | 0 | 0 | 0 | 0 | 0 | −0.50645 | 0 |
| 0.17794 | 0 | 0 | 0 | 0 | 0 | 0 | −0.75393 |
| 0 | 0.14651 | 0 | 0 | 0 | 0 | 0 | 0 |
| 0 | 0 | 0.14651 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0.20572 | 0 | 0.00846 | 0 | 0 |
| 0 | 0 | 0 | 0 | 0.20572 | 0 | −0.00846 | 0 |
| 0 | 0 | 0 | 0 | 0 | 0.14829 | 0 | 0 |
| 0 | 0 | 0 | 0 | 0 | 0 | 0.14829 | 0 |

| 12 | 13 | 14 | 15 | 16 | 17 | 18 | 19 |
|---|---|---|---|---|---|---|---|
| 0 | 0 | 0 | 0 | 0 | 0 | 0 | 0 |
| 0.15715 | 0 | 0 | 0 | 0 | 0 | 0 | 0 |
| 0 | 0.15715 | 0 | 0 | 0 | 0 | 0 | 0 |
| 0 | 0 | 0 | 0 | 0.24349 | 0 | 0.05160 | 0 |
| 0 | 0 | 0 | 0 | 0 | 0.24349 | 0 | −0.05160 |
| 0 | 0 | 0 | 0 | 0 | 0 | 0.18792 | 0 |
| 0 | 0 | 0 | 0 | 0 | 0 | 0 | 0.18792 |
| 0 | 0 | 0 | 0 | 0 | 0 | 0 | 0 |
| −0.68657 | 0 | 0 | 0 | 0 | 0 | 0 | 0 |
| 0 | −0.68657 | 0 | 0 | 0 | 0 | 0 | 0 |
| 0 | 0 | −0.46884 | 0 | 0 | 0 | 0 | 0 |
| 0 | 0 | 0 | −0.46884 | 0 | 0 | 0 | 0 |
| 0 | 0 | 0 | 0 | −0.71202 | 0 | 0.02953 | 0 |
| 0 | 0 | 0 | 0 | 0 | −0.71202 | 0 | −0.02953 |
| 0 | 0 | 0 | 0 | 0 | 0 | −0.65162 | 0 |
| 0 | 0 | 0 | 0 | 0 | 0 | 0 | −0.65162 |

TABLE 2

| 4 | 5 | 6 | 7 | 8 | 9 | 10 | 11 |
|---|---|---|---|---|---|---|---|
| 1.964 | 0.024 | −0.011 | −0.071 | 0.115 | 0.007 | −0.027 | −1.178 |
| −0.048 | 1.910 | 0.048 | 0.022 | 0.063 | 0.024 | −0.083 | 0.062 |
| −0.013 | −0.026 | 2.021 | −0.002 | 0.027 | −0.029 | 0.062 | −0.005 |
| 0.009 | −0.015 | 0.040 | 1.798 | 0.013 | 0.097 | 0.031 | −0.007 |
| −0.043 | 0.016 | −0.006 | 0.001 | 2.040 | −0.002 | −0.061 | −0.002 |
| 0.033 | −0.024 | −0.121 | −0.001 | −0.004 | 1.966 | −0.022 | −0.060 |
| 0.020 | 0.005 | −0.044 | 0.011 | 0.006 | 0.002 | 1.940 | 0.003 |
| −0.577 | 0.005 | 0.004 | −0.026 | 0.057 | 0.009 | −0.003 | 1.918 |
| −0.020 | −0.4931 | −0.002 | −0.045 | 0.009 | 0.000 | 0.008 | 0.017 |
| −0.014 | −0.008 | −0.491 | −0.035 | 0.005 | 0.016 | 0.012 | 0.058 |
| −0.003 | 0.009 | −0.010 | 0.010 | 0.012 | −0.005 | 0.061 | −0.072 |
| 0.001 | −0.015 | 0.011 | −0.002 | −0.012 | −0.040 | −0.028 | −0.031 |
| −0.005 | −0.001 | 0.003 | −0.668 | 0.009 | −0.086 | 0.002 | 0.006 |
| 0.005 | 0.009 | −0.006 | 0.007 | −0.676 | 0.001 | 0.127 | −0.013 |
| −0.010 | −0.005 | 0.011 | −0.000 | −0.000 | −0.464 | −0.008 | 0.045 |
| −0.002 | −0.015 | 0.001 | 0.11 | −0.013 | −0.001 | −0.545 | −0.012 |

TABLE 2-continued

| 12 | 13 | 14 | 15 | 16 | 17 | 18 | 19 |
|---|---|---|---|---|---|---|---|
| 0.038 | 0.067 | 0.034 | −0.023 | 0.082 | −0.073 | −0.017 | 0.039 |
| −0.961 | 0.021 | −0.033 | −0.031 | 0.045 | 0.146 | 0.120 | −0.037 |
| −0.018 | −0.667 | −0.005 | 0.044 | 0.009 | −0.006 | 0.027 | −0.048 |
| 0.008 | 0.046 | −0.009 | −0.008 | −0.796 | −0.044 | 0.035 | 0.042 |
| 0.018 | 0.002 | −0.035 | −0.033 | 0.003 | −0.866 | −0.039 | −0.070 |
| 0.055 | 0.044 | −0.017 | 0.114 | −0.021 | 0.000 | −0.840 | 0.069 |
| −0.021 | 0.022 | −0.003 | −0.051 | 0.009 | −0.030 | 0.026 | −0.715 |
| −0.017 | −0.018 | 0.030 | −0.009 | 0.033 | 0.036 | −0.017 | −0.000 |
| 1.936 | −0.013 | −0.020 | 0.029 | −0.020 | −0.018 | −0.017 | −0.000 |
| 0.016 | 1.914 | −0.003 | −0.008 | 0.033 | 0.012 | 0.070 | 0.010 |
| −0.030 | −0.006 | 1.921 | −0.023 | −0.038 | 0.030 | 0.009 | −0.032 |
| 0.055 | 0.059 | 0.025 | 1.946 | −0.009 | 0.025 | −0.002 | 0.014 |
| −0.002 | 0.036 | −0.001 | −0.005 | 1.880 | 0.000 | 0.0029 | −0.019 |
| 0.023 | 0.005 | 0.002 | −0.012 | −0.018 | 1.971 | 0.040 | −0.0393 |
| −0.014 | −0.044 | −0.021 | −0.014 | 0.024 | 0.034 | 1.941 | −0.010 |
| 0.009 | −0.030 | 0.003 | −0.017 | −0.005 | 0.033 | −0.017 | 1.919 |

Figures 11A, 11B:
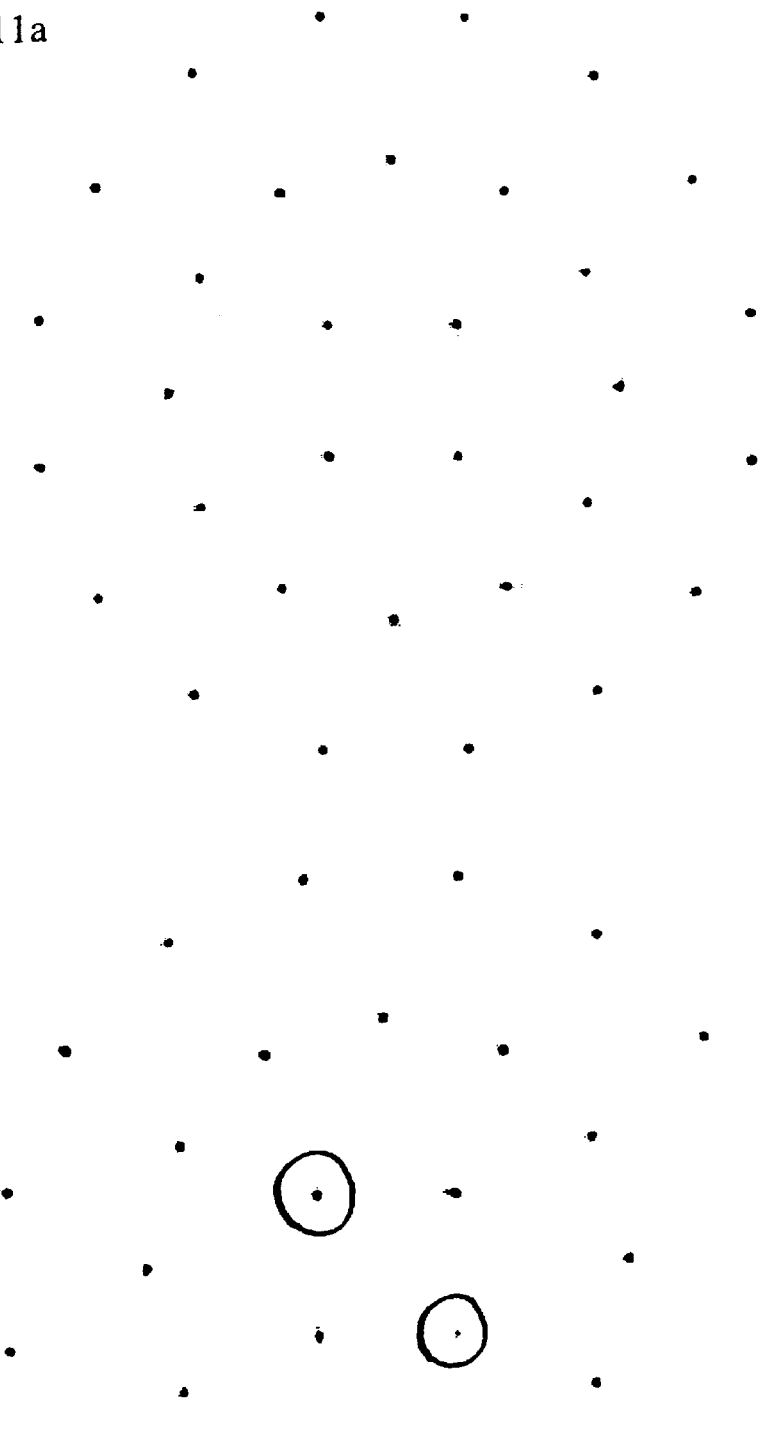
FIGS. 11a and 11b are diagrams of simulations of the output of a wavefront sensing device in accordance with the present invention in response to a plane wavefront and a defocussed wavefront respectively.

+1 and the black regions represent a transmission of −1. Using this mask FIGS. 11a and 11b were produced of simulated output intensity patterns for a plane incident wavefront (FIG. 11a) and for a defocussed incident wavefront with $b_4=0.3$ (FIG. 11b). The pair of spots which provide a measure for the defocus of the incident wavefront are circled in FIG. 11b and are easily distinguishable.

It will of course be understood that the wavefront sensing device is not limited to circular apertures or to Zernike mode expansions or even circular detector shapes. For example, complex segmented detectors such as annular apertures may be employed. Alternative methods of expanding a generalised wavefront shape may be employed. Also, the sensitivity of the binary phase mask to different mode orders can be tailored using conventional optimisation techniques so as to concentrate on those orders considered most important. Where the wavefront sensing device is used in an adaptive optics system the binary phase mask can be tailored to those modes which cause the greatest disruption to the optics system and for which there is the greatest need for correction.

The binary phase mask may be configured to identify a single Zernike mode, preferably the mode causing the greatest aberration. Such a single mode binary phase mask may be temporally multiplexed with binary phase masks specific to other Zernike modes. In a preferred embodiment this is achieved using a spatial light modulator (SLM) that is separately configurable to each of the individual binary phase masks in turn.

In a further alternative the structure of the binary phase mask need not be predetermined using expansions of a generalised wavefront shape. Instead, the wavefront sensing device may include an additional element consisting of a second layer neural network, and optimisation and learning algorithms can be devised to enable automatic selection and training of target sensing spots so as to tailor the sensing element to a specific wavefront correcting element.

The wavefront sensing device is particularly suitable for use in correcting aberrations in confocal microscope systems as the finite sized detectors pick up light from only a small region near the focal position and reject out of focus light from other parts of the system. Also, it has been found that only the lowest order Zernike aberrations significantly affect the point spread function when focusing through a refractive index mismatch which makes a binary wavefront modulating mask particularly suitable for use in confocal microscopy systems. The use of confocal microscopes in the imaging of thick biological tissue is greatly limited by the significant reduction both in signal level and resolution when focusing deep into a refractive-index-mismatched specimen. This limitation can be overcome by measuring the wavefront aberration and pre-shaping the input beam so as to cancel the effects of the aberration. In practice it is usually sufficient to correct only for the first two or three orders of spherical aberration to restore adequate image signal level and optical resolution at imaging depths of up to 50–100 wavelengths.

Figure 12:
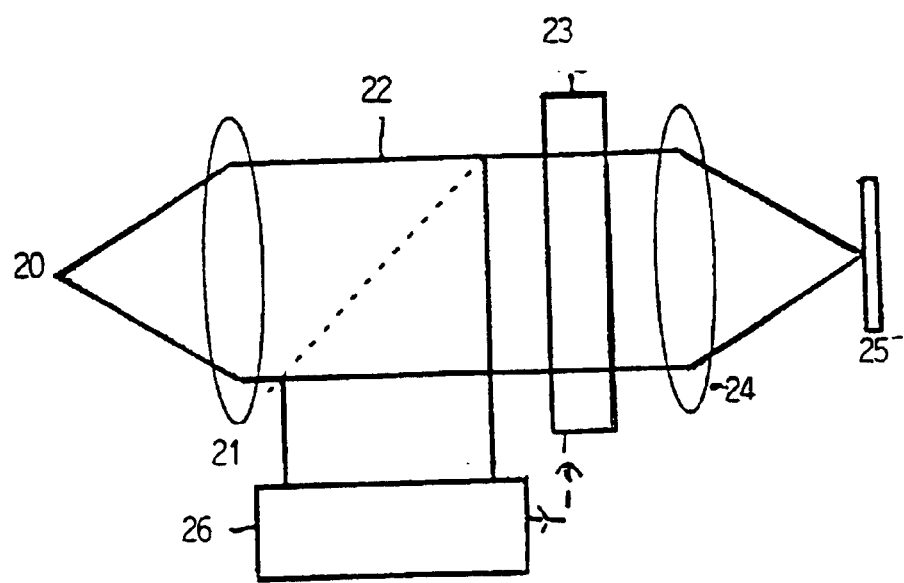
FIG. 12 is a schematic diagram of a wavefront sensing device in accordance with the present invention implemented in a confocal microscope.

FIG. 12 shows diagrammatically how the wavefront sensing device may be implemented in a confocal microscope. Light from the point source 20 is incident on a collimating lens 21 and passes through a beam splitter 22 and a wavefront corrector such as a liquid crystal device 23 to a fixed lens 24 in front of the specimen 25. Light scattered or emitted by the sample as fluorescence then acts as a source of wavefronts that pass back through the lens 24 and the wavefront corrector 23 to the beam splitter 22 and thence to the wavefront sensor 26 where the extent of any aberration in the wavefronts is measured, in a similar manner to that described previously with respect to FIG. 3. Thus, the wavefront corrector 23 pre-shapes the incident beam from the point source 20 as well as modulating the light scattered or emitted from the sample. The pre-aberration of the light from the point source 20 by the corrector 23 compensates for the specimen induced aberration resulting from the refractive index between the specimen and its surroundings that can be characterised by a phase aberration function. This can restore diffraction limited imaging deep inside a thick specimen. It is also effective when imaging complex objects and in particular i) a point scatterer of fluorescent object, ii) a fluorescent plane object, or iii) a fluorescent sea object.

In the case of the confocal microscope shown in FIG. 12, once a suitable correction for the specimen induced aberration is determined, the binary wavefront modulating mask in the wavefront sensor 26 may be removed, rendered non-modulating or may be designed to generate at least one spot that has no wavefront bias so that the confocal image of the specimen can be detected using the detectors of the wavefront sensor 26.

Where the pre-aberration is to correct for mismatched media, no azimuthal variation need be considered, only Zernike circle polynomials or order (mode) n and zero kind, i.e. $Z_n^0$ (p) need be considered. Table 3 sets out examples of the functional forms of the Zernike polynomials likely to be encountered in correcting for aberrations resulting from mismatched media.

TABLE 3

| n | $Z_n^0$ (p) | Description |
|---|---|---|
| 2 | $\sqrt{3}(2\rho^2 - 1)$ | Defocus |
| 4 | $\sqrt{5}(6\rho^4 - 6\rho^2 + 1)$ | First order spherical aberration |
| 6 | $\sqrt{7}(20\rho^6 - 30\rho^4 + 12\rho^2 - 1)$ | Second order spherical aberration |
| 8 | $\sqrt{9}(70\rho^8 - 140\rho^6 + 90\rho^4 - 20\rho^2 + 1)$ | Third order spherical aberration |

Analysis of the microscopy apparatus described above has shown the detectors are most responsive to light emanating from the region of the focus. Thus, the wavefront sensor 26 demonstrates axial selectivity in a similar manner to a confocal microscope, by rejecting out of focus light. Using pinhole detectors of sizes commensurate with those used in confocal microscopy, it has been found that the axial selectivity of the wavefront sensor 26 in combination with its finite sized detectors approaches that of a confocal microscope.

Figure 13:
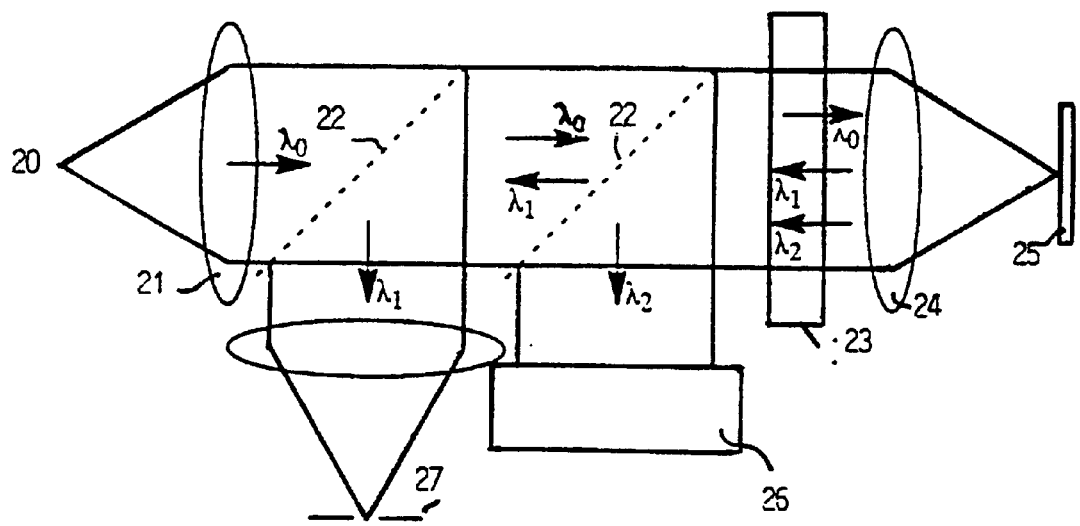
FIG. 13 is a schematic diagram of confocal microscopy apparatus incorporating a wavefront sensing device in accordance with the present invention.

The degree of correction performed by the wavefront corrector 23 is determined by the wavefront sensor 26. Of course, the liquid crystal device 23 may conveniently be substituted for a deformable mirror or other known wavefront corrective device. The wavefront sensor may be used in scanning confocal microscopy and also for multiplexed confocal microscopy in relation to field independent aberrations. As described above, the wavefront sensing device is particularly useful in providing a measure of the correction required for microscopes focusing through mis-matched media. Moreover, the sensing device is suitable for use not only in relation to brightfield applications but also to fluorescence and two-photon applications. With reference to fluorescent applications of the wavefront sensor, FIG. 13 shows a confocal microscope suitable for use with a fluorescent labelled specimen and incorporating a wavefront sensor. In general, a specimen is rendered visible by specifically labelling its structure with a fluorescent material. As a result the specimen may appear highly structured (having dark and bright areas) or may be weakly fluorescent. Both of these circumstances can make it difficult to measure wavefront aberration reliably through the specimen. However, with the wavefront sensing device described herein it is possible to measure wavefront aberration by introducing additional non-specific secondary labelling, for example a fluorescent dye or beads that do not selectively mark specific parts of the specimen and use light emitted by the uniformly distributed fluorophore to measure the aberrations. Furthermore, if the additional fluorophore emits light at a different wavelength from that used to image the specimen normally it is then a simple matter to separate the imaging light from the wavefront sensing light using a dichroic beam splitter or filter 22, for example. In this way the light efficiency of the microscope can be maximised. In the case of FIG. 13, the illuminating light has a wavelength $\lambda_0$, the specific primary labelling of the specimen has a wavelength $\lambda_1$, which is detected by the confocal detector 27 and the non-specific secondary labelling emits light at a wavelength $\lambda_2$ that is detected by the wavefront sensing device 26 and used to determine the extent of aberration of the wavefront. Advantages are also envisaged where the non-specific secondary fluorophore is excited by a different wavelength light source to the primary fluorophore.

Under some circumstances it may be advantageous to move the wavefront modulating mask of the wavefront sensor to the illumination path between the lens element 21 and the beam splitter 22. In this way the specimen is illuminated with an array of biased points with the fluorescent emissions from these points then being imaged onto the finite sized detectors 27. This reduces problems of dispersion with respect to the binary mask.

On a molecular scale a normal fluorescent microscope works by the fact that the fluorescent molecules in the specimen absorb a single photon of illuminating light and then emit a single photon of longer wavelength fluorescent light. In a multi-photon microscope a shot pulsed laser beam is used to illuminate the specimen and due to nonlinear effects two (or more) photons can be absorbed by the fluorescent molecules in the specimen simultaneously and a single photon of shorter wavelength fluorescent light can be emitted. Such a process is inherently nonlinear, that is to say the amount of fluorescence emitted by the specimen is proportional to the square of the incident light intensity (doubling the illuminating intensity more than doubles the fluorescent emission—typically it quadruples for 2-photon systems). Taking advantage of this nonlinear effect, a microscopy system employing multi-photon fluorescence can inherently generate sectioned images simply because the illuminating light is brightest in the focal region. Whilst a sectioning multi-photon microscope can be constructed in accordance with the embodiments described earlier, it is not strictly necessary to use a confocal detector to achieved sectioned imaging and often a broad area detector is used in order to collect as much light as possible. The multi-photon microscope is equivalent to a conventional fluorescence microscope with the intensity of fluorescence proportional to the incident light intensity but with an effective (virtual) pinhole that is also equal to the intensity distribution. Thus, a real pinhole is not required provided the positive and negative wavefront biases are applied sequentially rather than simultaneously.

Figure 14:
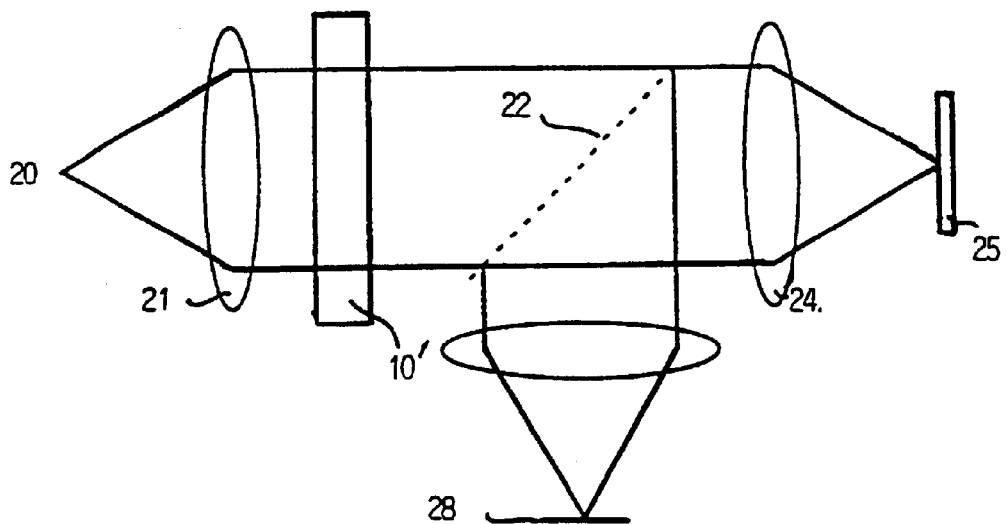
FIG. 14 is a schematic diagram of a multi-photon microscope equipped with a wavefront sensing device in accordance with the present invention.

In an alternative microscopy system shown in FIG. 14, which relies upon multi-photon fluorescence, a wavefront modulating mask 10' is positioned so that it only modulates the illuminating light. In this arrangement the wavefront modulating mask 10' is positioned between the light source and the dichroic beam splitter 22 rather than between the beam splitter and the object lens. As mentioned previously, a large area detector 28 (rather than finite sized pinhole detectors) is used to maximise the amount of light recovered whilst still ensuring sectioned imaging of the specimen 25 under a multi-photon system. The aberrations are sensed by applying positive and negative wavefront biases to the illuminating light cyclically, i.e. temporally multiplexed. When a positive bias is applied to the illuminating light it partially corrects the aberrations in the illumination system resulting in an increase in the detected intensity of the focal plane illumination and therefore a non-linear increase in the fluorescent emission. As with the wavefront sensing devices described earlier, a differential signal is obtained by subtracting the detected intensity with a negatively applied bias from that obtained with a positively applied bias. This differential signal is proportional to the amount of aberration in the illumination system between the mask and the specimen. As before, even though a large area detector is employed, optical sectioning of the specimen is obtained. This arrangement has the particular advantage that correction and bias are performed on the illuminating light alone which in many practical instances has to be attenuated anyway in order to protect the specimen from damage. The detection path is unchanged and therefore the system is as optically efficient as a normal multi-photon system (albeit a little slower).

As mentioned above, the error signal generated by the wavefront sensing device is relatively large and linear for small incident wavefront errors. This makes the wavefront sensing device particularly suitable for use in adaptive optics systems. Thus, with reference to FIG. 12, the output of the wavefront sensor 26 may be connected via a control device (not shown) to the wavefront corrector 23 so that the optical system may correct for detected wavefront aberrations automatically as is required in adaptive optics systems. In this respect the control device calculates the necessary correction factor for the optical system based on the detected differential in intensity for one or more pairs of spots. Furthermore, the implementation of the wavefront sensing device in an adaptive optics system should afford significant noise advantages over conventional sensors such as Shack-Hartmann sensors.

The wavefront sensing device described above has the advantage that the binary phase mask can be fabricated using conventional lithographic techniques and replicated using standard pressing/moulding techniques. Moreover, the ease of fabrication ensures greater accuracy in the patterning of the phase mask. This in turn means that the output spot positions can be known accurately and the detectors can be positioned reliably. Moreover, unlike Shack-Hartmann sensors, the wavefront sensing device described herein does not require CCD-type arrays of sensors in the focal plane.

A further advantage of the wavefront sensing device described herein where the patterning of the binary phase mask is based on Zernike modes is that the output signals are very simply related to the Zernike modes which greatly simplifies the necessary processing of the output signals in comparison to sub-aperture sensing systems where the measurements for each sub-aperture must be 'stitched' together to reconstruct the incident wavefront.

It should be noted that the wavefront sensing device is also suitable for use in low order mode in sub-aperture array based systems similar to those used for Roddier type curvature and Shack-Hartmann sensing. It is also suitable for use in CD readers and writers and in non-adaptive optics systems for example as a means of measuring the performance of near diffraction limited optical systems or as an aid in alignment of such systems.

Although reference has been made almost exclusively to phase modulation, other forms of binary modulation may alternatively be employed with the wavefront sensing device. For example, amplitude or polarisation modulation may be employed in which case a bright unmodulated spot will form on the axis of the output plane. This though can be an advantage as the unmodulated light is available for other purposes, for example in producing an image in a laser scanning confocal microscope. Furthermore, reference herein to finite sized detectors is not intended as limited to pin holes but advantageously can also include optical fibres.

What is claimed is:

1. A wavefront sensing device comprising:
   modulating mask means which applies equal positive and negative aberrations to light incident on the mask means and produces in combination with one or more fixed focusing elements a pair of light points in a plane of focus; and
   one or more detectors located at or near the plane of focus for determining differences in intensity between the pair of light points;
   the difference being representative of the deviation in shape of the wavefront of the incident light from the ideal wavefront shape.

2. A wavefront sensing device as claimed in claim 1, wherein a single mask applies both the positive and the negative aberrations to light incident on the mask whereby the single mask generates a pair of spatially separated light points and wherein respective spatially separated detectors are provided to determine the difference in intensity between the light points.

3. A wavefront sensing device as claimed in claim 2, wherein the mask is a binary phase mask.

4. A wavefront sensing device as claimed in claim 3, wherein the binary phase mask is an off axis Fresnel zone plate.

5. A wavefront sensing device as claimed in claim 3, wherein the binary phase mask is biased with a predetermined defocus a.

6. A wavefront sensing device as claimed in claim 5, wherein the defocus a is in the range 0.6 to 0.9.

7. A wavefront sensing device as claimed in claim 6, wherein the defocus a is 0.779.

8. A wavefront sensing device as claimed in claim 1, wherein the modulating mask means is a binary polarisation or binary amplitude mask.

9. A wavefront sensing device as claimed in claim 1, wherein the modulating mask means is patterned with a binarised version of a fraction of a desired off-axis wavefront shape.

10. A wavefront sensing device as claimed in claim 9, wherein the patterning of the binary modulating mask is dependent on the desired wavefront shape of the incident light defined by reference to one or more Zernike polynomial modes.

11. A wavefront sensing device as claimed in claim 10, wherein the binary modulating mask is patterned to simultaneously produce a plurality of spatially separated pairs of light points each pair being representative of a different Zernike polynomial mode.

12. A wavefront sensing device as claimed in claim 2, wherein the single mask consists of a spatial light modulator that is adjustable to sequentially cycle between the positive aberration and the negative aberration to be applied to the incident light.

13. A wavefront sensing device as claimed in claim 1, wherein the one or more detectors have respective finite apertures located at or near the plane of focus.

14. A wavefront sensing device as claimed in claim 1, further comprising a plurality of masks,
   the one or more fixed focusing elements comprises an array of fixed focusing elements corresponding with the plurality of masks, and
   the one or more detectors comprises an array of detectors.

15. A wavefront sensing device as claimed in claim 1, wherein each of the one or more fixed focusing elements is a fixed focus lens.

16. A wavefront sensing device as claimed in claim 15, wherein the modulating mask means is located on the opposite side of the one or more lens to the one or more detectors.

17. A wavefront sensing device as claimed in claim 15, wherein the modulating mask means is located between the one or more lens and the one or more detectors.

18. A wavefront sensing device as claimed in claim 1, wherein each of the one or more fixed focusing elements is a mirror.

19. A wavefront sensing device as claimed in claim 1, further comprising control means for controlling a wavefront correction device for adaption of the wavefront of the incident light.

20. A wavefront sensing device as claimed in claim 19, wherein the wavefront correction device is a binary phase mask.

21. An adaptive optics system comprising:
one or more fixed focusing elements for imaging a specimen;
an adjustable wavefront correction device;
a wavefront sensing device as claimed in claim 1; and
a control device in communication with the wavefront correction device and the wavefront sensing device for adjusting the wavefront correction device in accordance with the wavefront aberration measured by the wavefront sensing device.

22. A confocal microscope comprising one or more fixed focussing elements for imaging a specimen, and an adaptive optics system as claimed in claim 21 wherein the one or more detectors of the wavefront sensing device include finite sized apertures for generating a confocal image of the specimen.

23. A multi-photon confocal microscope comprising one or more fixed focusing elements for imaging a specimen containing one or more fluorescent substances, an adaptive optics system as claimed in claim 21 and a large area detector whereby a sectioned image of the specimen is generated by virtue of the illuminating light being substantially brighter in the focal region.

24. A wavefront sensing device comprising:
a modulating mask which applies equal positive and negative aberrations to light incident on the mask and produces in combination with one or more fixed focussing elements a pair of spatially separated light points in a plane of focus; and
spatially separate detectors located at or near the plane of focus for determining differences in intensity between the pair of light points;
the difference being representative of the deviation in shape of the wavefront of the incident light from the ideal wavefront shape.

25. A wavefront sensing device as claimed in claim 24, wherein the mask is a binary phase mask.

26. A wavefront sensing device as claimed in claim 25, wherein the binary phase mask is an off-axis Fresnel zone plate.

27. A wavefront sensing device as claimed in claim 25, wherein the binary phase mask is biased with a predetermined defocus a.

28. A wavefront sensing device as claimed in claim 27, wherein the defocus a is in the range 0.6 to 0.9.

29. A wavefront sensing device as claimed in claim 28, wherein the defocus a is 0.779.

30. A wavefront sensing device as claimed in claim 24, wherein the modulating mask is a binary polarisation or binary amplitude mask.

31. A wavefront sensing device as claimed in claim 24, wherein the modulating mask is patterned with a binarised version of a fraction of a desired off-axis wavefront shape.

32. A wavefront sensing device as claimed in claim 31, wherein the patterning of the binary modulating mask is dependent on the desired wavefront shape of the incident light defined by reference to one or more Zernike polynomial modes.

33. A wavefront sensing device as claimed in claim 32, wherein the binary modulating mask is patterned to simultaneously produce a plurality of spatially separated pairs of light points each pair being representative of a different Zernike polynomial mode.

34. A wavefront sensing device as claimed in claim 24, wherein the mask consists of a spatial light modulator that is adjustable to sequentially cycle between the positive aberration and the negative aberration to be applied to the incident light.

35. A wavefront sensing device as claimed in claim 24, wherein the one or more detectors have respective finite apertures located at or near the plane of focus.

36. A wavefront sensing device as claimed in claim 24, further comprising a plurality of masks,
the fixed focussing elements comprises an array of fixed focussing elements corresponding with the plurality of masks, and
the one or more detectors comprises an array of detectors.

37. A wavefront sensing device as claimed in claim 24, wherein each of the one or more fixed focussing elements is a fixed focus lens.

38. A wavefront sensing device as claimed in claim 37, wherein the modulating mask is located on the opposite side of the one or more lens to the one or more detectors.

39. A wavefront sensing device as claimed in claim 37, wherein the modulating mask is located between the one or more lens and the one or more detectors.

40. A wavefront sensing device as claimed in claim 24, wherein each of the one or more fixed focussing elements is a mirror.

41. A wavefront sensing device as claimed in claim 24, further comprising control means for controlling a wavefront correction device for adaption of the wavefront of the incident light.

42. A wavefront sensing device as claimed in claim 41, wherein the wavefront correction device is a binary phase mask.

* * * * *